(12) United States Patent
Bergeron et al.

(10) Patent No.: US 11,062,098 B1
(45) Date of Patent: Jul. 13, 2021

(54) AUGMENTED REALITY INFORMATION DISPLAY AND INTERACTION VIA NFC BASED AUTHENTICATION

(71) Applicant: Capital One Services, LLC, McLean, VA (US)

(72) Inventors: George Bergeron, Falls Church, VA (US); Bryant Yee, Washington, DC (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/990,300

(22) Filed: Aug. 11, 2020

(51) Int. Cl.
| | |
|---|---|
| G06K 7/10 | (2006.01) |
| H04L 9/32 | (2006.01) |
| G06F 21/62 | (2013.01) |
| G06Q 40/02 | (2012.01) |
| G06F 3/14 | (2006.01) |
| H04L 9/08 | (2006.01) |
| G06F 3/0484 | (2013.01) |

(52) U.S. Cl.
CPC .......... *G06K 7/10297* (2013.01); *G06F 3/14* (2013.01); *G06F 21/6245* (2013.01); *G06Q 40/02* (2013.01); *H04L 9/0861* (2013.01); *H04L 9/3226* (2013.01); *G06F 3/0484* (2013.01)

(58) Field of Classification Search
CPC .. G06K 7/10297; G06K 7/10118; G06F 3/14; G06F 21/6245; G06F 3/0484; H04L 9/0861; H04L 9/3226
USPC ................................................ 235/451, 492
See application file for complete search history.

(56) References Cited

U.S. PATENT DOCUMENTS

| 4,683,553 A | 7/1987 | Mollier |
| 4,827,113 A | 5/1989 | Rikuna |

(Continued)

FOREIGN PATENT DOCUMENTS

| CA | 3010336 A1 | 7/2017 |
| CN | 101192295 A | 6/2008 |

(Continued)

OTHER PUBLICATIONS

Satina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Paultep Savusdiphol
(74) *Attorney, Agent, or Firm* — Kacvinsky Daisak Bluni PLLC

(57) ABSTRACT

Various embodiments are generally directed to improving card security by providing a user a contactless card with no sensitive card information, such as card number, card verification value, and expiration date, printed thereon, and displaying the sensitive card information relative to the card in augmented reality (AR) based on successful NFC-based user authentication. According to examples, the NFC-based user authentication may be performed by one-tapping or single tapping the contactless card to user mobile device. One or more portions of the sensitive card information may be obfuscated to further enhance card security. Moreover, the user can interact with AR elements including the sensitive card information to perform various actions.

20 Claims, 11 Drawing Sheets

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |

(56) References Cited

U.S. PATENT DOCUMENTS

| | | |
|---|---|---|
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,477,852 B1 * | 10/2016 | Neale .................. G06Q 20/409 |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,836,736 B1 * | 12/2017 | Neale .................. G06Q 20/4014 |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,713,645 B1 * | 7/2020 | Neale ..................... G06K 1/128 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |

(56) References Cited

U.S. PATENT DOCUMENTS

| | | |
|---|---|---|
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0072115 A1* | 3/2013 | Dobyns ............ H04B 7/0608 455/41.1 |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |

(56) References Cited

U.S. PATENT DOCUMENTS

| | | |
|---|---|---|
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2020/0202313 A1* | 6/2020 | Eidam .............. A61B 5/6803 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016

(56) References Cited

OTHER PUBLICATIONS

[retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug BIG SEVEN open source crypto-messengers to be compared—or: comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieeved from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?d=576a7b910d2d6&location=browse, 135 pages.
Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

* cited by examiner

AUGMENTED REALITY INFORMATION DISPLAY AND INTERACTION VIA NFC BASED AUTHENTICATION

BACKGROUND

A primary account number and other types of card information, such as expiration date, card verification value, card provider, etc. may be physically printed onto a card, which can be easily stolen or compromised by fraudsters. For example, card numbers and related information are frequently stolen using cameras at payment terminals. One possible method of thwarting card information theft is to provide a user a card with just the payment instrument (e.g., chip, magnetic stripe) and no printed card information. While this may be a helpful first step, cards without any printed information may be inconvenient for the user in some use cases and should not be the only security measure. Accordingly, there is a need for providing card information in a highly secure and convenient manner.

SUMMARY

Various embodiments are generally directed to improving card security by providing a user a contactless card with no sensitive card information, such as card number, card verification value, and expiration date, printed thereon, and displaying the sensitive card information relative to the card in augmented reality (AR) based on successful NFC-based user authentication. According to examples, the NFC-based user authentication may be performed by one-tapping or single tapping the contactless card to user mobile device. One or more portions of the sensitive card information may be obfuscated to further enhance card security. Moreover, the user can interact with AR elements including the sensitive card information to perform various actions.

DETAILED DESCRIPTION

Figure 1A:
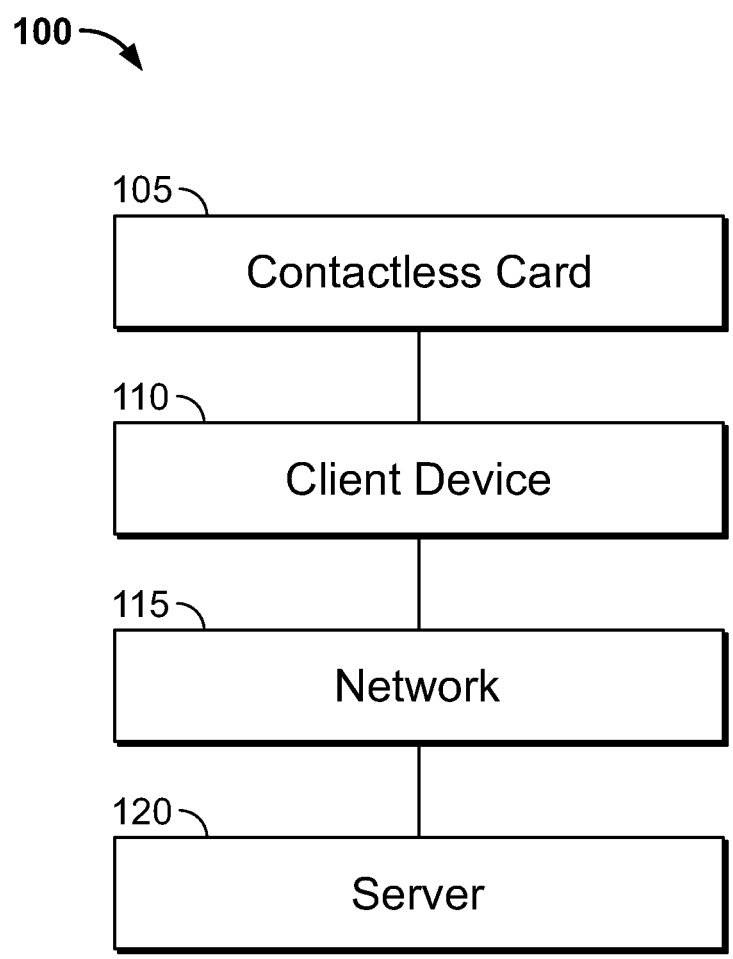
FIG. 1A illustrates an example data transmission system in accordance with one or more embodiments.

Various embodiments are generally directed to improving card security by displaying sensitive card information (e.g., account number, card verification value, expiration date) on a client device (e.g., smartphone) in augmented reality (AR) and allowing a user to interact with such information based on successful NFC-based user authentication. In examples, the user authentication may be performed by "tapping" a contactless card belonging to the user to the client device. A single tap of the contactless card by the user may be configured to perform various actions, one of which may be user authentication. As will be further described in detail below, this may be referred to as "one-tap" or "single tap" authentication and is a highly secure way of verifying user identity to ensure, for example, that it is the authorized user who is actually using the card and not a fraudster. It may be understood that the term "tap," "tapping," or "tapped" may broadly be referred to as brining the contactless card physically close to a computing device (e.g., client device) such that the NFC reader coil of the device can read or receive data from the card.

According to embodiments, one-tap or single tap user authentication involves the user tapping the user's contactless card to the user's client device, which allows near-field communication (NFC) to be established between the client device and the contactless card. Using NFC, the client device may receive one or more cryptograms from the card. The cryptogram(s) may contain encrypted information related to the identity of the authorized user(s) of the contactless card, such as a unique customer identifier or any other suitable information indicating at least that the card belongs to a particular authorized user. In some examples, the information in the one or more cryptograms may be decrypted at the client device using at least one diversified key and the decrypted information may be matched against authentication information (e.g., customer identifier) stored on the client device. In other examples, the received cryptograms may be sent to one or more remote servers (e.g., authentication servers), which may decrypt the cryptogram information and match it against user authentication information (e.g., customer identifier) stored at the remote servers or databases. In either examples, a match between the decrypted information and the authentication information produces a successful NFC-based user authentication.

Upon successfully authenticating the user, sensitive card information can be displayed in AR. In examples, the user may hold the card in front of a camera of the client device and a display interface of the client device may digitally superimpose, overlay, or augment the card information on the card via the display interface. In further examples, the card may be issued to the user without any sensitive card information printed thereon. Moreover, the card may be the contactless card used to authenticate the user. In one embodiment, successful authentication may automatically open the display interface and instruct the user to place the card in front of the camera. Instructions may be displayed until the card is detected. In a further embodiment, successful authentication may automatically open and log the user in to a mobile application (otherwise referred to as "mobile app") where the user is provided more features and customizability with respect to the AR experience.

According to examples, the sensitive card information may be displayed in AR such that it is overlaid on the card itself, e.g., as if the information was originally printed onto the card. In other examples, the card information may be displayed adjacent to card. Some of the sensitive card information (e.g., card number) may be displayed in AR with respect to the front of the card and other information (e.g., card verification value) may be displayed in AR with respect to the back of the card. In some examples, additional layers of security may be added by obfuscating some of the AR displayed information with symbols or characters (e.g., X, *, #). For instance, if the card number "xxxx-xxxx-xxxx-1234" is displayed, the user may select the number, which would prompt the user to provide additional verification information (e.g., alphanumeric password, PIN, biometric password, voice recognition, etc.) to reveal the hidden numbers. The added layer of security may be configured or adjusted via the mobile app.

Moreover, the AR displayed information may be configured such that it is selectable or interactable by the user. For example, the user can configure a selection of the displayed card number to be an automatic copy function so that the card number can be pasted to a card number field of a website. In another, the user can configure a selection of the card number to be an automatic redirect to a landing page of the mobile app for managing the card account and setting or configuring card-related features. Further, a selection of the card verification value may be configured to be a request by the user to the card provider to change the verification value, which can be coordinated between the mobile app and one or more backend computing devices maintaining such information.

In previous solutions, card security was only as strong as the user's ability to limit card visibility during use at payment terminals, which is increasingly more difficult to do with the proliferation of image capturing devices. The embodiments and examples described and set forth herein are advantageous over the previous solutions in numerous ways. For instance, a card may be issued to the user free of any sensitive card information, such as card number, card verification value, expiration date, and the like, printed thereon. Thus, when the card is utilized at a payment terminal, no sensitive information can be stolen by nearby fraudsters. When the user desires to see or access the sensitive information, however, it can be done so via AR only upon successful NFC-based user authentication, which still gives the user familiarity of conventional cards. Further, the AR displayed information may be partially or completely obfuscated, encrypted, or otherwise hidden, which can be revealed with the input of additional verification information. Accordingly, the numerous layers of authentication and verification and the selective viewing of sensitive card information significantly improves card security.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1A illustrates an example data transmission system according to one or more embodiments. As further discussed below, system 100 may include contactless card 105, client device 110, network 115, and server 120. Although FIG. 1A illustrates single instances of the components, system 100 may include any number of components.

System 100 may include one or more contactless cards 105, which are further explained below with reference to FIG. 3A and FIG. 3B. In some embodiments, contactless card 105 may be in wireless communication, utilizing NFC in an example, with client device 110.

System 100 may include client device 110, which may be a network-enabled computer. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. Client device 110 also may be a mobile computing device, for example, an iPhone, iPod, iPad from Apple® or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

The client device 110 device can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some examples, client device 110 of system 100 may execute one or more applications, such as software applications, that enable, for example, network communications with one or more components of system 100 and transmit and/or receive data.

Client device 110 may be in communication with one or more servers 120 via one or more networks 115 and may operate as a respective front-end to back-end pair with server 120. Client device 110 may transmit, for example, from a mobile device application executing on client device 110, one or more requests to server 120. The one or more requests may be associated with retrieving data from server 120. Server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests.

System 100 may include one or more networks 115. In some examples, network 115 may be one or more of a wireless network, a wired network or any combination of wireless network and wired network and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 802.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks.

System 100 may include one or more servers 120. In some examples, server 120 may include one or more processors, which are coupled to memory. Server 120 may be configured as a central system, server or platform to control and call various data at different times to execute a plurality of workflow actions. Server 120 may be configured to connect to the one or more databases. Server 120 may be connected to at least one client device 110.

Figure 1B:
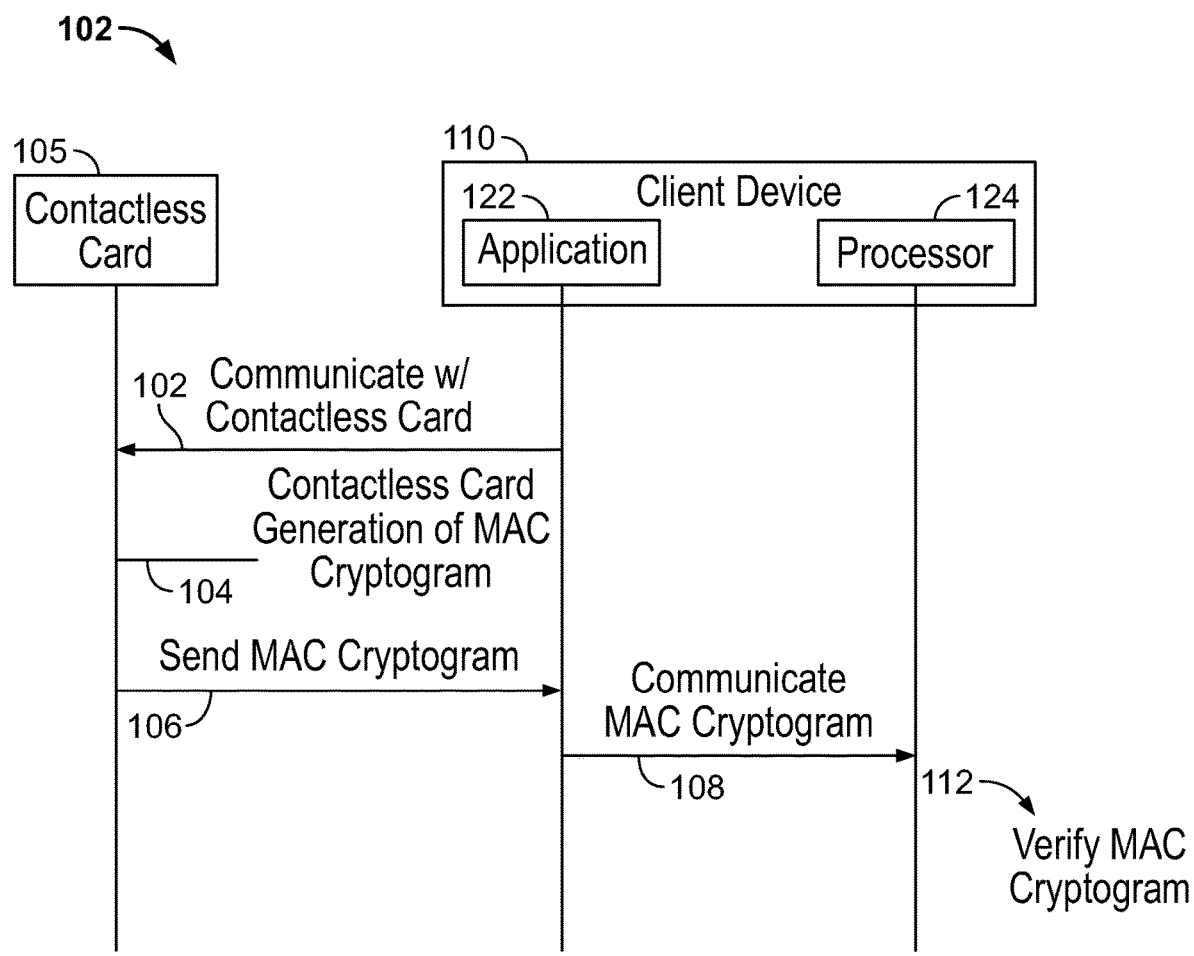
FIG. 1B illustrates an example sequence diagram for providing authenticated access in accordance with one or more embodiments.

FIG. 1B illustrates an example sequence diagram for providing authenticated access according to one or more embodiments. The diagram may include contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format.

For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file," "Read Capabilities file," and "Select NDEF file." At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124. At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a server 120 in data communication with the client device 110 (as shown in FIG. 1A). For example, processor 124 may output the MAC cryptogram for transmission to server 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

It may be understood that in some examples, the contactless card 105 may initiate communication after the contactless card is brought near the client device 110. By way of example, the contactless card 105 may send the client device 110 a message, for instance, indicating that the contactless card has established communication. Thereafter, the application 122 of client device 110 may proceed to communicate with the contactless card at step 102, as described above.

Figure 2:
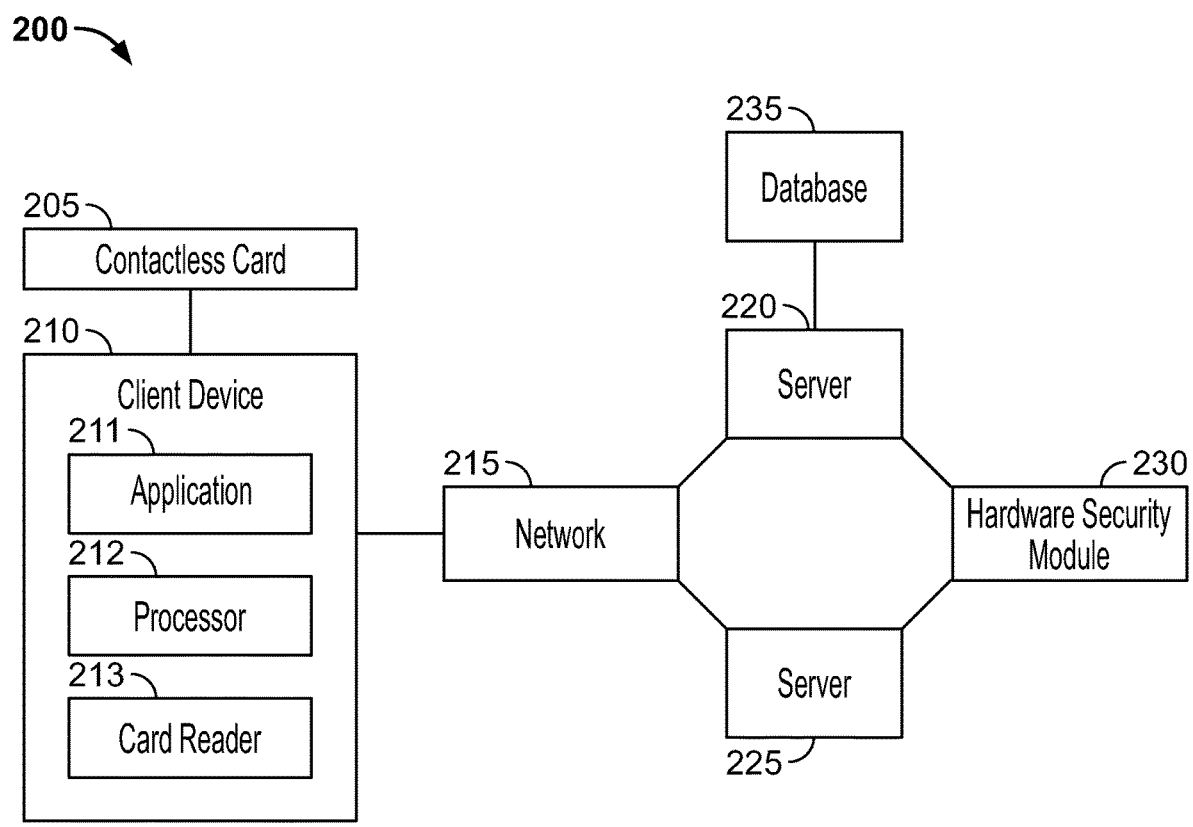
FIG. 2 illustrates an example system using a contactless card in accordance with one or more embodiments.

FIG. 2 illustrates an example system 200 using a contactless card. System 200 may include a contactless card 205, one or more client devices 210, network 215, servers 220, 225, one or more hardware security modules 230, and a database 235. Although FIG. 2 illustrates single instances of the components, system 200 may include any number of components.

System 200 may include one or more contactless cards 205, which are further explained below with respect to FIG. 3A and FIG. 3B. In some examples, contactless card 205 may be in wireless communication, for example NFC, with client device 210. For example, contactless card 205 may include one or more chips, such as a radio frequency identification chip, configured to communication via NFC or other short-range protocols. In other embodiments, contactless card 205 may communicate with client device 210 through other means including, but not limited to, Bluetooth, satellite, Wi-Fi, wired communications, and/or any combination of wireless and wired connections. According to some embodiments, contactless card 205 may be configured to communicate with card reader 213 (which may otherwise be referred to herein as NFC reader, NFC card reader, or reader) of client device 210 through NFC when contactless card 205 is within range of card reader 213. In other examples, communications with contactless card 205 may be accomplished through a physical interface, e.g., a universal serial bus interface or a card swipe interface.

System 200 may include client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, a client device 110 as described with reference to FIG. 1A or FIG. 1B.

Client device 210 may be in communication with one or more servers 220 and 225 via one or more networks 215. Client device 210 may transmit, for example from an application 211 executing on client device 210, one or more requests to one or more servers 220 and 225. The one or more requests may be associated with retrieving data from one or more servers 220 and 225. Servers 220 and 225 may receive the one or more requests from client device 210. Based on the one or more requests from client device 210, one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests.

System 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead are maintained within the HSM 230. For example, one or more HSMs 230 may be configured to perform at least one of key derivations, decryption, and MAC operations. The one or more HSMs 230 may be contained within, or may be in data communication with, servers 220 and 225.

System 200 may include one or more networks 215. In some examples, network 215 may be one or more of a wireless network, a wired network or any combination of wireless network and wired network, and may be configured to connect client device 210 to servers 220 and/or 225. For example, network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from contactless card 205 and client device 210 may include NFC-based communication, cellular network between client device 210 and a carrier, and Internet between the carrier and a backend.

In addition, network 215 may include, without limitation, telephone lines, fiber optics, IEEE Ethernet 802.3, a wide area network, a wireless personal area network, a local area network, or a global network such as the Internet. In addition, network 215 may support an Internet network, a wireless communication network, a cellular network, or the like, or any combination thereof. Network 215 may further include one network, or any number of the exemplary types of networks mentioned above, operating as a stand-alone network or in cooperation with each other. Network 215 may utilize one or more protocols of one or more network elements to which they are communicatively coupled. Network 215 may translate to or from other protocols to one or more protocols of network devices. Although network 215 is depicted as a single network, it should be appreciated that according to one or more examples, network 215 may include a plurality of interconnected networks, such as, for example, the Internet, a service provider's network, a cable television network, corporate networks, such as credit card association networks, and home networks.

In various examples according to the present disclosure, client device 210 of system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 2, any number of devices 210 may be used. Card reader 213 may be configured to read from and/or communicate with contactless card 205. In conjunction with the one or more applications 211, card reader 213 may communicate with contactless card 205. In examples, the card reader 213 may include circuitry or circuitry components, e.g., NFC reader coil, that generates a magnetic field to allow communication between the client device 210 and the contactless card 205.

The application 211 of any of client device 210 may communicate with the contactless card 205 using short-range wireless communication (e.g., NFC). The application 211 may be configured to interface with a card reader 213 of client device 210 configured to communicate with a contactless card 205. As should be noted, those skilled in the art would understand that a distance of less than twenty centimeters is consistent with NFC range.

In some embodiments, the application 211 communicates through an associated reader (e.g., card reader 213) with the contactless card 205.

In some embodiments, card activation may occur without user authentication. For example, a contactless card 205 may communicate with the application 211 through the card reader 213 of the client device 210 through NFC. The communication (e.g., a tap of the card proximate the card reader 213 of the client device 210) allows the application 211 to read the data associated with the card and perform an activation. In some cases, the tap may activate or launch application 211 and then initiate one or more actions or communications with an account server 225 to activate the card for subsequent use. In some cases, if the application 211 is not installed on client device 210, a tap of the card against the card reader 213 may initiate a download of the application 211 (e.g., navigation to an application download page). Subsequent to installation, a tap of the card may activate or launch the application 211, and then initiate (e.g., via the application or other back-end communication) activation of the card. After activation, the card may be used in various transactions including commercial transactions.

According to some embodiments, the contactless card 205 may include a virtual payment card. In those embodiments, the application 211 may retrieve information associated with the contactless card 205 by accessing a digital wallet implemented on the client device 210, wherein the digital wallet includes the virtual payment card. In some examples, virtual payment card data may include one or more static or dynamically generated virtual card numbers.

Server 220 may include a web server in communication with database 235. Server 225 may include an account server. In some examples, server 220 may be configured to validate one or more credentials from contactless card 205 and/or client device 210 by comparison with one or more credentials in database 235. Server 225 may be configured to authorize one or more requests, such as payment and transaction, from contactless card 205 and/or client device 210.

Figure 3A:
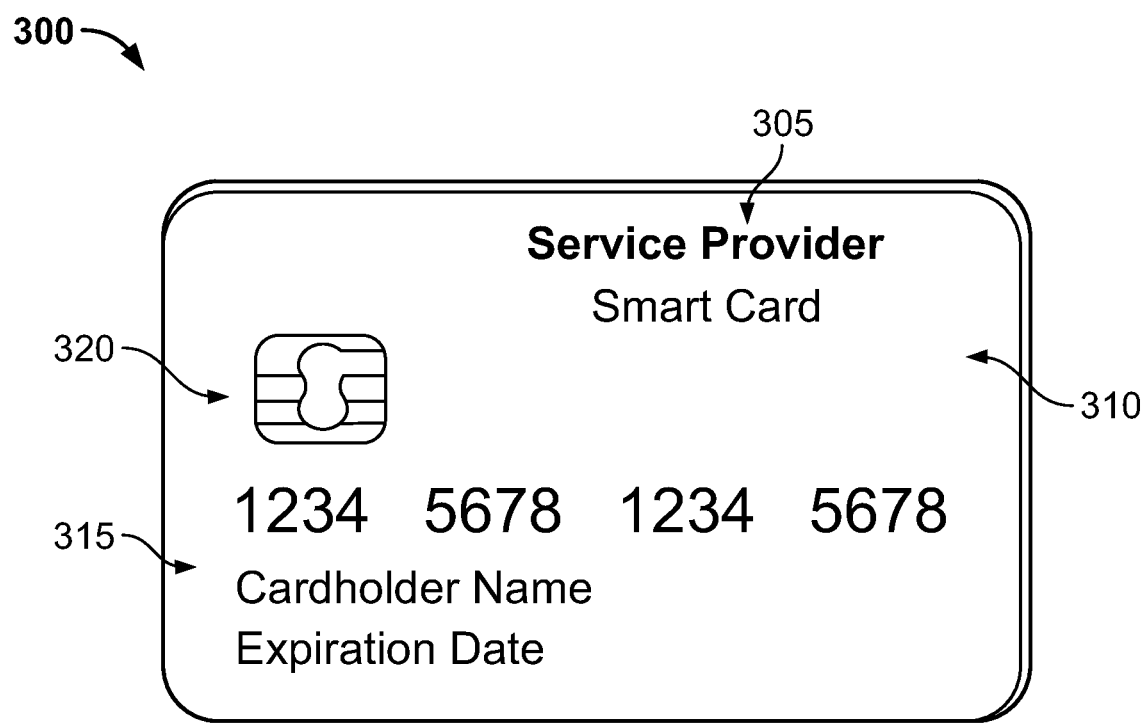
FIG. 3A illustrates an example contactless card in accordance with one or more embodiments.

FIG. 3A illustrates one or more contactless cards 300, which may include a payment card, such as a credit card, debit card, or gift card, issued by a service provider 305 displayed on the front or back of the card 300. In some examples, the contactless card 300 is not related to a payment card, and may include, without limitation, an identification card. In some examples, the payment card may include a dual interface contactless payment card. The contactless card 300 may include a substrate 310, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 300 may have physical characteristics compliant with the ID-1 format of the ISO/IEC 7810 standard, and the contactless card may otherwise be compliant with the ISO/IEC 14443 standard. However, it is understood that the contactless card 300 according to the present disclosure may have different characteristics, and the present disclosure does not require a contactless card to be implemented in a payment card.

The contactless card 300 may also include identification information 315 displayed on the front and/or back of the card, and a contact pad 320. The contact pad 320 may be configured to establish contact with another communication device, such as a user device, smart phone, laptop, desktop, or tablet computer. The contactless card 300 may also include processing circuitry, antenna and other components not shown in FIG. 3A. These components may be located behind the contact pad 320 or elsewhere on the substrate 310. The contactless card 300 may also include a magnetic strip or tape, which may be located on the back of the card (not shown in FIG. 3A).

Figure 3B:
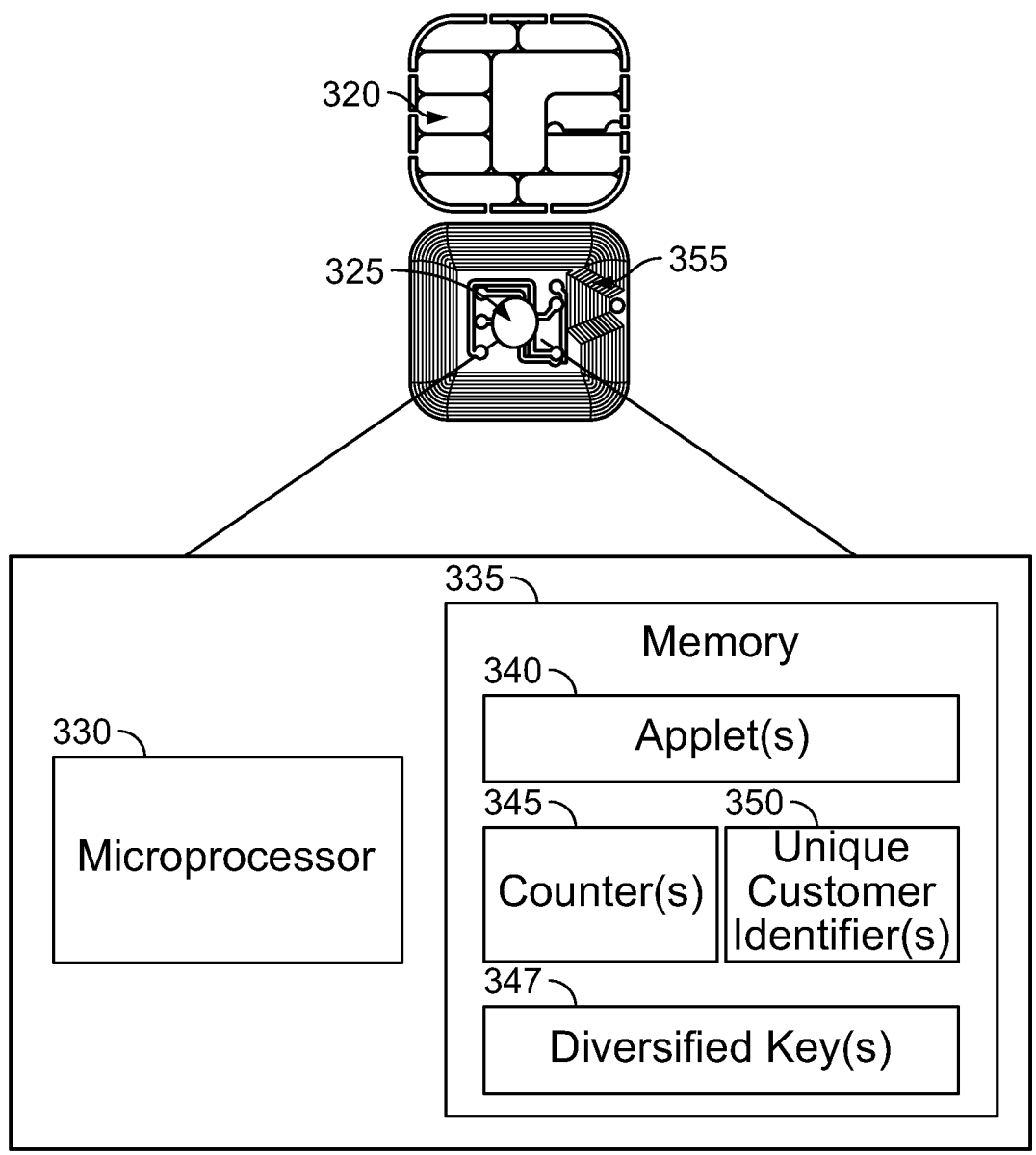
FIG. 3B illustrates an example contact pad of a contactless card in accordance with one or more embodiments.

As illustrated in FIG. 3B, the contact pad 320 of FIG. 3A may include processing circuitry 325 for storing and processing information, including a microprocessor 330 and a memory 335. It is understood that the processing circuitry 325 may contain additional components, including processors, memories, error and parity/CRC checkers, data encoders, anti-collision algorithms, controllers, command decoders, security primitives and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 335 may be configured to store one or more applets 340, one or more counters 345, one or more diversified keys 347, one or more customer identifiers 350, and other types of suitable data or information. The one or more applets 340 may include one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may include a numeric counter sufficient to store an integer. As will be further described below, the one or more diversified keys 347 may be used to encrypt various information, such as information about the user or customer (e.g., customer identifier 450) to generate cryptogram(s) that can be sent to, for example, a mobile device for at least authentication purposes. The customer identifier 350 may include a unique alphanumeric identifier assigned to a user of the contactless card 300, and the identifier may distinguish the user of the contactless card from other contactless card users. In some examples, the customer identifier 350 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 320 or entirely separate from it, or as further elements in addition to processor 330 and memory 335 elements located within the contact pad 320.

In some examples, the contactless card 300 may include one or more antennas 355. The one or more antennas 355 may be placed within the contactless card 300 and around the processing circuitry 325 of the contact pad 320. For example, the one or more antennas 355 may be integral with the processing circuitry 325 and the one or more antennas 355 may be used with an external booster coil. As another example, the one or more antennas 355 may be external to the contact pad 320 and the processing circuitry 325.

In an embodiment, the coil of contactless card 300 may act as the secondary of an air core transformer. The terminal may communicate with the contactless card 300 by cutting power or amplitude modulation. The contactless card 300 may infer the data transmitted from the terminal using the gaps in the contactless card's power connection, which may be functionally maintained through one or more capacitors. The contactless card 300 may communicate back by switching a load on the contactless card's coil or load modulation. Load modulation may be detected in the terminal's coil through interference.

As explained above, the contactless cards 300 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that includes a cryptographically secure OTP encoded as an NDEF text tag.

In examples, when preparing to send data (e.g., to a mobile device, to a server, etc.), the contactless card 300 may increment a counter value of a counter of the one or more counters 345. The contactless card 300 may then provide a master key, which may be a distinct key stored on the card 300, and the counter value as input to a cryptographic algorithm, which may also be stored on the card 300 and produces a diversified key as output, which may be one of the diversified keys 347. It is understood that the master key and the counter value is also securely stored in memory of a device or component receiving data from the contactless card 300 so as to decrypt the data using the diversified key that was used by the card to encrypt the transmitted data. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 300 may then encrypt the data (e.g., the customer identifier 350 and any other data) using the diversified key in the form of one or more cryptograms that can be sent to a mobile device, for example, as NFC data exchange format (NDEF) messages. The contactless card 300 may then transmit the encrypted data (e.g., cryptograms) to the mobile device, which can then decrypt the cryptograms using the diversified key (e.g., the diversified key generated by the mobile device using the counter value and the master key stored in memory thereof).

Figure 4:
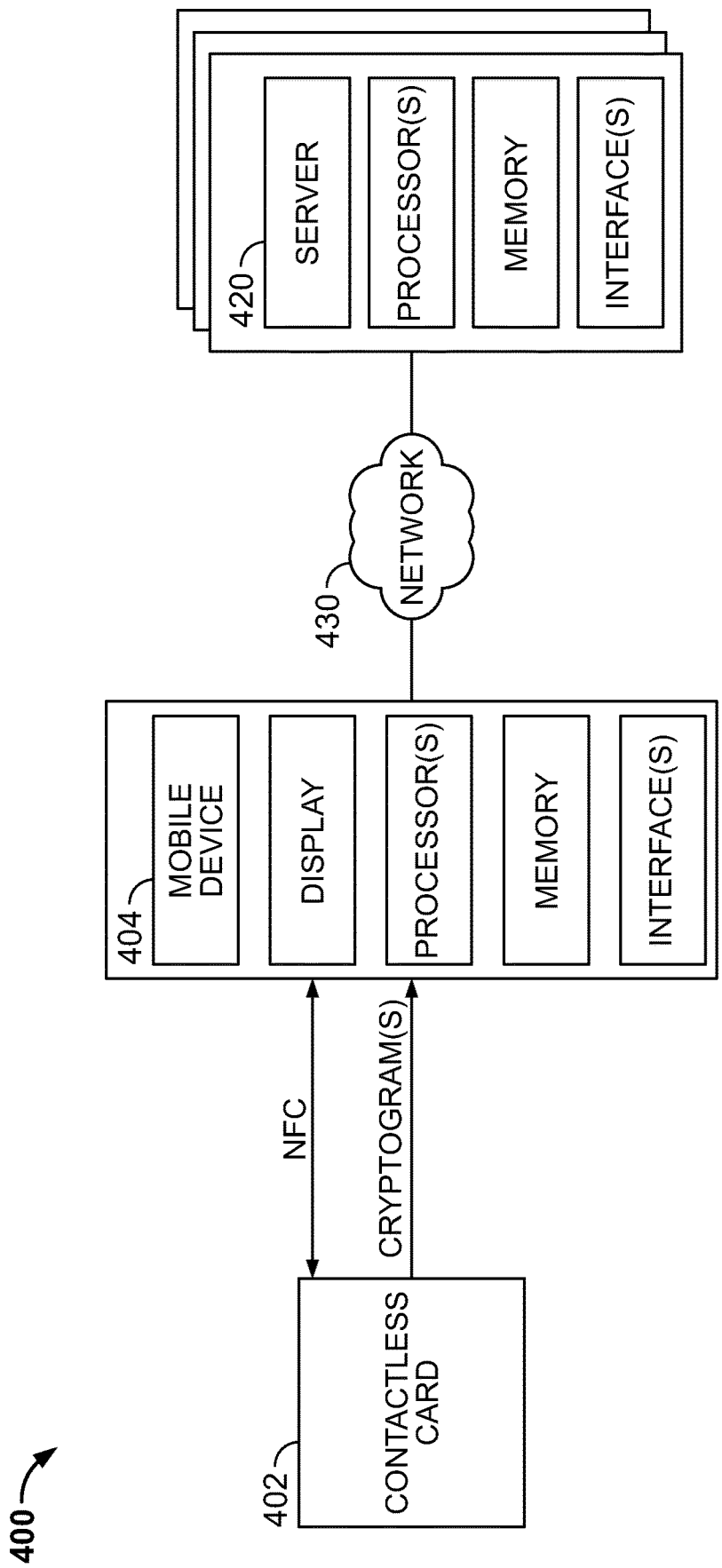
FIG. 4 illustrates an example of NFC-based user authentication in accordance with one or more embodiments.

FIG. 4 illustrates an example of NFC-based user authentication 400 according to one or more embodiments. As described above, sensitive card information cannot be AR-displayed on a mobile device unless the user requesting such display has been properly authenticated. For example, the NFC-based user authentication 400 may be performed by one-tapping or single tapping the contactless card to the mobile device, e.g., which may otherwise be known as one-tap or single tap user or contactless card authentication.

In examples, a user of contactless card 402 may configure a single tap of the card to perform various actions, one of which can be automatic user authentication. One-tap or single tap user authentication may be useful or convenient in various use-cases, such as the user needing to quickly and securely access a particular program, function, service, card-related feature, etc. without having to manually enter username and password every instance, such as automatically logging in to and opening a mobile app (e.g., banking app) or automatically displaying sensitive card information in AR, which will be further described in detail below.

In embodiments, the configuration of the single tap or one tap of the contactless card 402 may be set by the user via a banking app on mobile device 404 (e.g., smartphone, tablet, any portable computing device). For instance, the user may first open the mobile app and login to the user's account by providing single sign-on identifier (SSOID) information, such as a username, email, password, PIN, etc. Before the single tap or one-tap of the card can be configured via the banking app, the user may be required to authenticate the contactless card 402 by tapping the card to the mobile device 404 so as to verify that the contactless card 402 actually belongs to the user and that the user is indeed an authorized user.

In examples, the user may tap the contactless card 402 to the mobile device 404. When tapped, NFC may be established between the contactless card 402 and the mobile device 404. The card 402 may send one or more cryptograms to the mobile device 404 via NFC. It may be understood that tapping the contactless card 402 to the mobile device 404 may broadly refer to the card being in sufficient or requisite proximity to the mobile device 404 such that at least one NFC reader coil of the mobile device 404 is able to communicate (e.g., read or receive data) with the card 402 and/or is able to cause the card 402 to send data to the mobile device 404.

As described above, the one or more cryptograms may be sent as NDEF message(s) and contain encrypted information, such as a customer identifiers (e.g., customer identifier 350). For instance, the customer identifier may be a unique alphanumeric identifier assigned to the authorized user of the contactless card 402 and used to distinguish the user from other contactless card users. It may be understood that the customer identifier stored in the card may be generated when the card 402 is created and the identifier may be also stored, for instance, in a backend customer database of the card provider.

According to examples, when the mobile device 404 receives the one or more cryptograms from the contactless card 402, card authentication may be performed in at least two ways. In one example, the encrypted customer identifier in the received one or more cryptograms may be securely decrypted at the mobile device 404 and the customer identifier may then be matched against user information. In another example, the received one or more cryptograms may be sent to and decrypted at one or more servers 420 (e.g., backend servers, authentication servers, cloud-based servers), which may be remote and located on the backend, provider-side of the network. The servers 420 may then securely decrypt the customer identifier and match it against user information. If the user information does not include a customer identifier associated with the user performing the card authentication, further information on the decrypted customer identifier may be obtained that can be matched against the user information.

User information may broadly be understood to mean any information that is verifiably associated with or traced to the user logged in to the user account via the mobile app, e.g., customer identifier, SSOID, legal name, nickname, date of birth, social security number, phone number, address, or any other information provided by the user to the card provider when establishing the user account (online or otherwise).

In the example of decrypting the cryptogram(s) at the mobile device 404, a diversified key that was used to crypt the information in the one or more cryptograms may be used to perform decryption, as described above. User information may be obtained from the one or more servers 420 via network 430 by request or otherwise. For instance, the obtained user information may include the customer identifier associated with the logged-in user. If that customer identifier matches the decrypted customer identifier from the one or more cryptograms, then authentication of card 402 is successful. If there is a mismatch, it may be determined that the contactless card 402 does not belong or authorized to the user performing the card authentication via the user's account through the mobile app, at which point, for instance, the user's account can be locked for further analysis. In further examples, if the customer identifier associated with the logged-in user is not provided in the obtained user information, the mobile app may request the server(s) 420 to provide further information on the decrypted customer identifier, such as user's legal name, date of birth, SSN, etc. If any of this further information matches any information in the obtain user information, then successful authentication of the card 402 can be confirmed.

The contactless card 402 may be authenticated at the one or more servers 420 in a similar manner, with the exception of the server(s) 420 obtaining the user information associated with the logged-in user and/or further information on the decrypted customer identifier by querying or searching customer databases. The one or more cryptograms may be decrypted by the one or more servers 420 also in a similar manner, e.g., via the diversified key that was used to encrypt the information in the cryptograms including the customer identifier. The one or more servers 420 may have access to numerous types of backend databases and other authentication-based data stores or services.

Once the contactless card 402 has been properly authenticated, the user may configure the single tap or one-tap of the card 402 to function as single tap or one-tap card authentication. In some embodiments, the user may link or associate a subsequent action to a successful authentication, such as automatic AR display of sensitive card information, as will be further described below, automatic access to user's account via the mobile app, automatic one-time card payment, etc.

In examples, the customer identifier stored in the contactless card 402 may be securely stored on the mobile device 404 upon successful card authentication for easy matching when one tap is performed. Thus, after the one-tap configurations have bene set, when the contactless card 402 is again tapped to the mobile device 404, the mobile device can decrypt the customer identifier received in the cryptogram(s) and match it against the customer identifier already securely stored in memory of the mobile device 402 for rapid authentication. If the one-tap or single tap user authentication is processed at the one or more servers 420, the server may be aware of the one-tap configuration set by the user for the user account, and thus, when a decrypted customer identifier associated with that user account is received, user authentication can be quickly confirmed by the server(s) 420. To at least that end, the user can perform one-tap or single tap user authentication only via contactless card 402, e.g., the physical card 402 itself may now be the primary authentication instrument.

It may be understood that, in some examples, the above-described single tap or one-tap configuration may involve the user "opening" the mobile app on the mobile device 404 so that mobile device can connect to the server(s) 420 but not having to login as conventionally required. In at least that way, the user can advantageously perform various card-related actions using a single tap of the card without having to login to the user's account every time. Moreover, by opening the mobile app to utilize the one-tap functionality, the user may be saved from the annoyance or inconvenience of inadvertent card-related actions caused by inadvertent taps of the card to the mobile device. In other examples, the user can configure multiple, consecutive single taps of the card to perform consecutive actions, e.g., where a first tap automatically logs the user in to the mobile app (such as in instances where logging in to the mobile app is first required) and a second tap automatically opens an AR interface for displaying sensitive card information in AR.

Figure 5B:
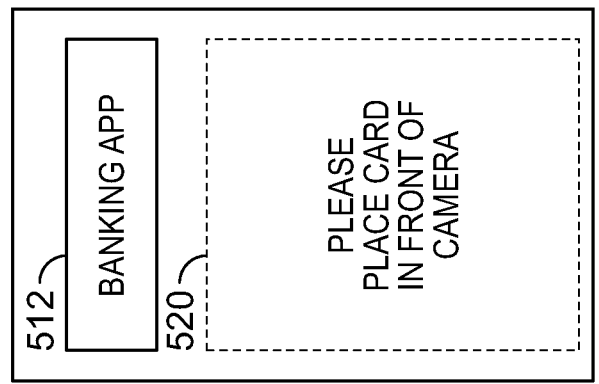
FIG. 5B illustrates an example of automatic mobile app launch for accessing an augmented reality interface in accordance with one or more embodiments.
Figure 5B:
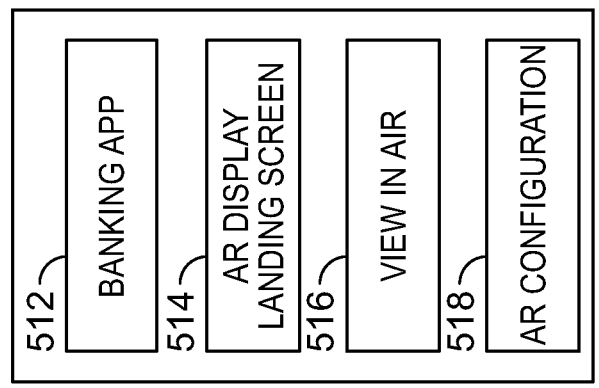
Figure 5A:
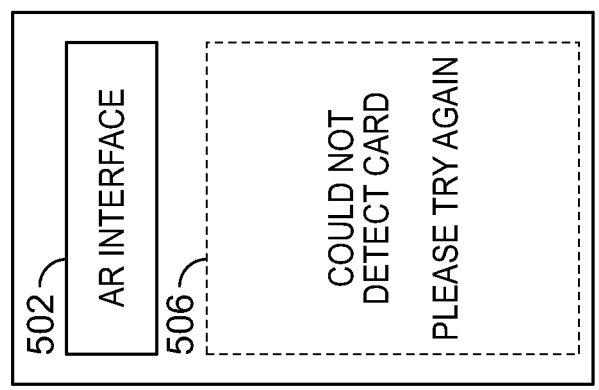
FIG. 5A illustrates an example augmented reality interface in accordance with one or more embodiments.
Figure 5A:
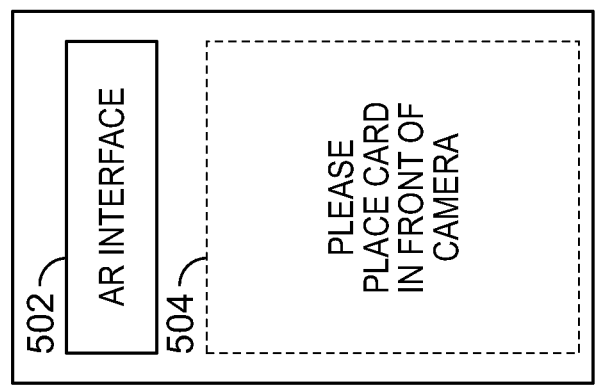

FIG. 5A illustrates an example AR interface 502 according to one or more embodiments. As described above, one-tap or a single tap of the user's contactless card may be configured to automatically perform NFC-based user authentication. Upon successful user authentication, the user mobile device may be configured to automatically open an AR interface 502 for displaying in AR sensitive card information associated with the contactless card.

When the AR interface 502 is opened, instruction text 504 may be displayed within a AR display boundary (indicated by the dashed box), which may instruct the user to "Please Place Card in Front of Camera," as shown. The user may then place either the front or back of the contactless in front of the camera of the mobile device to view sensitive card information. If the camera cannot detect the card or if the card is otherwise obscured, further instruction text 506 may be displayed, which can read "Could Not Detect Please Try Again." Advantageously, with a single tap of the contactless card, user authentication and access to the AR interface 502 can be performed in a smooth and efficient manner.

FIG. 5B illustrates an example of automatic mobile app launch 522 for accessing an AR interface according to one or more embodiments. According to embodiments, the user mobile device may be configured to automatically login and open banking app 512 upon successful one-tap NFC-based user authentication. In examples, accessing the banking app 512 may allow additional AR-based features not normally available in the "quick-launch" AR interface 502 illustrated in FIG. 5A. As shown, the banking app 512 may display an AR display landing screen 514, a "view in AR" icon 516, and an "AR configuration" icon 518.

The AR configuration icon 518, when selected, allows the user to configure various actions and features associated with the AR display of sensitive information. As will be further described below, for example, the user can customize the AR display such that only a portion of the card number is displayed while the remaining portion is obfuscated by characters or symbols. In examples, the user may set a separate password, PIN, etc. for revealing the obfuscated portions. Moreover, the font, color, the display location of AR elements may also be configured. Additionally, by way of the banking app 512, the user may be provided the option to view in AR sensitive card information for other customer cards associated with the user account.

When the user selects the view in AR icon 516, the banking app 512 may open an AR interface, similar to the AR interface 502 of FIG. 5A. As shown, instruction text 520 may be displayed to instruct the user to place the card in front of the camera of the mobile device.

Figure 6:
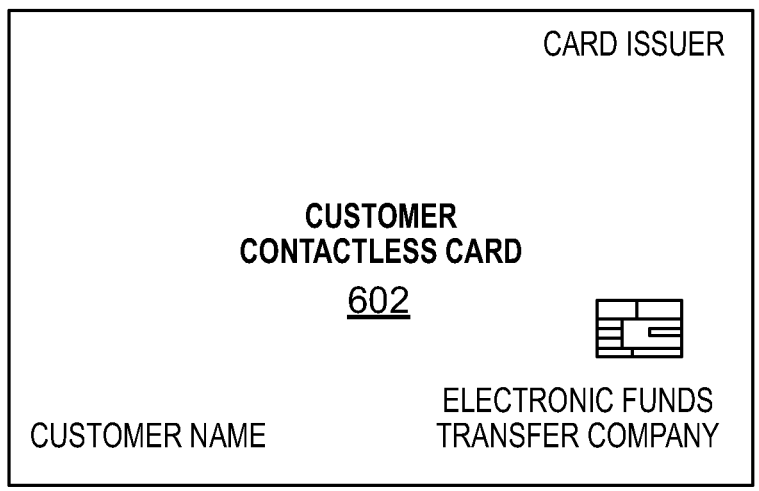
FIG. 6 illustrates an example customer contactless card without any printed sensitive information in accordance with one or more embodiments.
Figure 6:
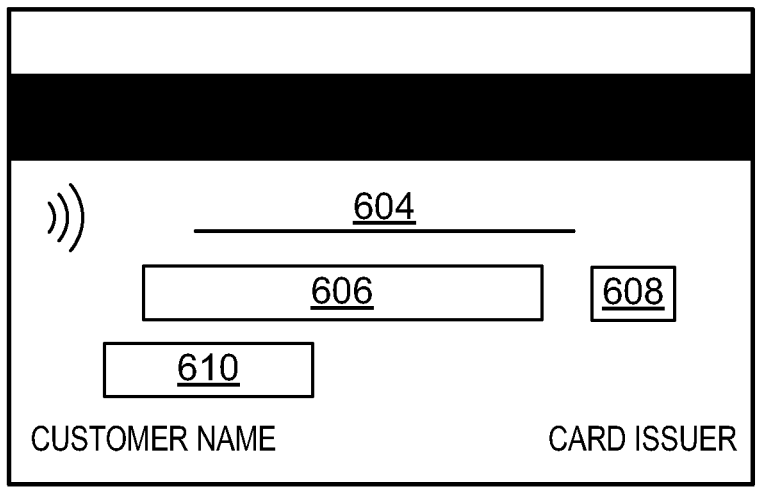

FIG. 6 illustrates an example customer contactless card 602 (front and back) having no sensitive information printed thereon according to one or more embodiments. As shown, the front of the card may include at least a customer name (e.g., user name) at the bottom left-hand corner, a name of the card issuer (e.g., bank) at the top right-hand corner, and a name of the electronic funds transfer company at the bottom right-hand corner. Moreover, the front of the card 602 may include a contact pad or any other suitable integrated circuit (IC) chip. It may be understood that other types of non-sensitive information may be included on the front of the card 602, such as images, graphics, corporate logos, etc.

As further shown, the back of the card may include the customer name at the bottom left-hand side and the name of the card issuer at the bottom right-hand side. The back side of the card 602 may also include a magnetic strip for swipe-based transactions. The customer contactless card 602 may also include a symbol indicating that the card is contactless and enabled for contactless transactions. Further, the backside may include a user signature line 604, and at least three separate empty boxes 606, 608, and 610. Box 606 may outline where the card number can be displayed in AR via the AR interface. Box 608 may outline where the card verification value (CVV) can be displayed in AR. Box 610 may outline where the expiration date can be displayed in AR. It may be understood that the boxes may be included for purposes of convenience and not required.

As set forth above, sensitive card information may broadly refer to any information associated with the card that is susceptible to theft, such as the card number (e.g., primary account number), CVV, expiration date, etc.

Figure 7:
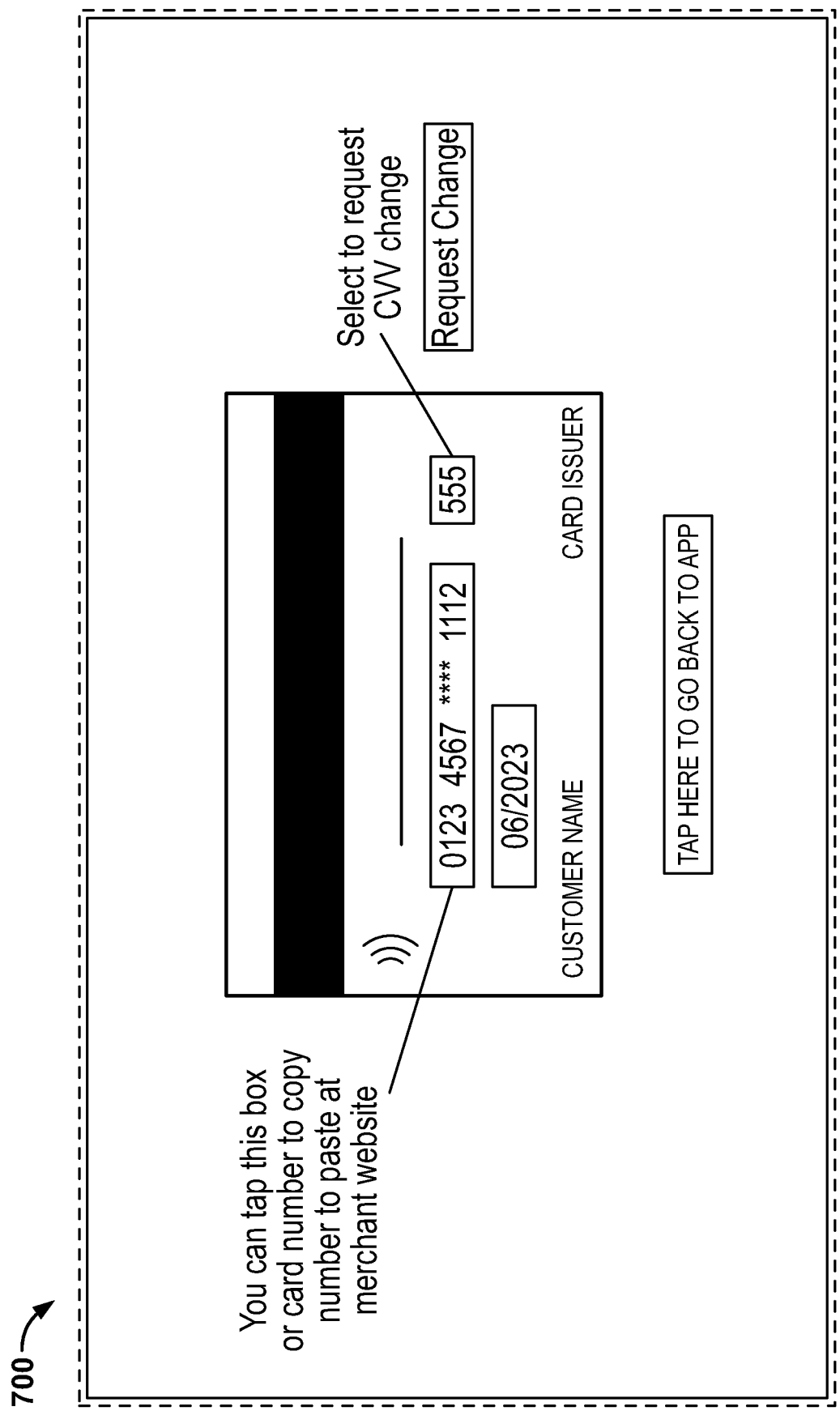
FIG. 7 illustrates an example of sensitive information displayed in AR via an AR interface in accordance with one or more embodiments.

FIG. 7 illustrates an example of sensitive card information displayed in AR via AR interface 700 according to one or more embodiments. For ease of explanation, the customer contactless card 602 of FIG. 6 is shown in FIG. 7 and will be used to describe the AR display of the sensitive information.

For example, the user may hold the contactless card 602 in front of the camera of the user's mobile device, where the backside of the card is facing camera forward. As shown, the card number, the CVV, and the expiration date may all be superimposed on the card in AR respectively in boxes 606, 608, and 610. The card number "0123 4567 ** 1112" may be displayed in box 606, for instance, in a font and color that is easily readable by the user. The CVV and the expiration date can similarly be displayed in boxes 608 and 610** in an easily readable manner.

As further shown and as described above, one or more portions of sensitive information, such as the card number, may be obfuscated to add additional layers of security. To reveal the hidden numbers, the user may select the obfuscated portion, which may prompt the user to enter verification information, such as a PIN, password, etc. If the entered verification information is correct, then the hidden numbers may be revealed and displayed in AR similar to the other portions of the number that were not obfuscated. In examples, obfuscation may be configured by the user in the mobile app, such as which types of sensitive information to obfuscate, which portions thereof to obfuscate, setting up the mechanisms for revealing the hidden portions (setting up PIN, password, etc.) and other related features. In addition to the highly secure NFC-based user authentication performed by the user, as set forth above, obfuscation of portions of the sensitive information displayed in AR may further improve overall card security, e.g., in instances where a fraudster is able to see the AR displayed information on the user mobile device.

As further shown, various types of callouts may also be displayed in AR in the AR interface 700 pertaining to the AR elements. For example, a callout related to the card number may be displayed to indicate to the user "You can tap this box or card number to copy number to paste at merchant website," which will be further described in detail below. In another example, a callout related to the CVV number may be displayed to indicate that the user can select the "request change" icon to change the CVV number, e.g., if the user desires to "roll" the CVV number after a predetermined period of time. The interface 700 may also display other selectable icons anywhere on the interface, such as the "tap here to go back to app" icon, which may transition the interface back to the bank app interface.

It may be understood that while the backside of the card is shown and described in FIG. 7, the sensitive card information may be displayed on any side of the card. Further, since the user may view the sensitive card information in AR from different angles and at different positions on the mobile device, it may be understood that the AR interface may perform automatic scaling or scale-to-fit procedures such that the sensitive information remains displayed in their respective and correct positions relative to the card 602 regardless of the differing viewing angles or positions.

In examples, the AR experience may be advantageously enhanced by configuring the AR interface to seamlessly transition the AR display of various information as the user flips the customer card 602 from the front-side to the backside or vice versa. In at least that regard, the user may be able to enjoy an enhanced interactive AR experience. Augmented reality, or AR, as used herein may broadly refer to an interactive experience of a real-world environment where the objects that reside in the real world are enhanced by computer-generated perceptual information, sometimes across multiple sensory modalities, including visual, auditory, haptic, somatosensory, olfactory, etc.

Figure 8:
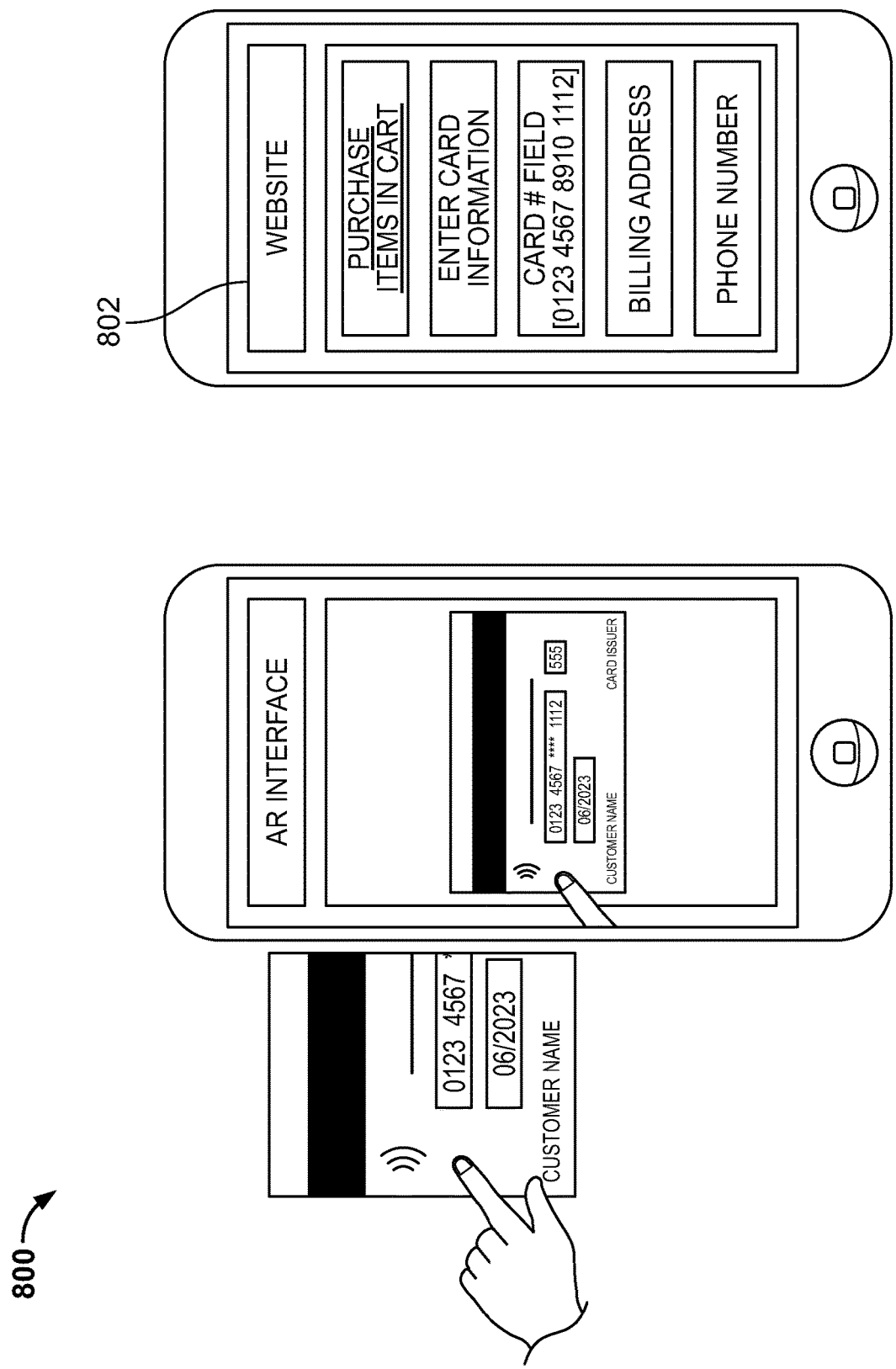
FIG. 8 illustrates an example interaction with AR elements in accordance with one or more embodiments.

FIG. 8 illustrates an example user interaction 800 with AR elements according to one or more embodiments. For ease of explanation, the AR elements described above with respect to FIG. 7 will be used to describe the user interaction 800.

As shown, the user may interact with one or more interactable or selectable AR elements displayed via the AR interface. For example, the user may select, by tapping or selecting with the user's finger, the AR element (e.g., the superimposed card number, the box 606, or any virtual element or otherwise indicating that the user is selecting the card number). Once selected, the user's interaction with the AR element may cause a particular action, such as copying the card number to a digital clipboard or the like to paste or otherwise use the card number at a merchant website. Thus, as illustrated, the copied card number may then be pasted to the "card #field" of the website 802 via the mobile device to make the online transaction experience more convenient for the user. In other examples, selection of the AR element associated with the card number may allow the user to automatically process recurring purchases (e.g., subscriptions).

Although now shown, other actions, such as requesting a CVV change, may be possible by selecting a different AR element. The user may press or select the CVV number on the card or box 608 or the request change icon to process such request. It may be understood that, in some example, the AR element(s) and associated action(s) may be configurable by the user via the banking app.

Figure 9:
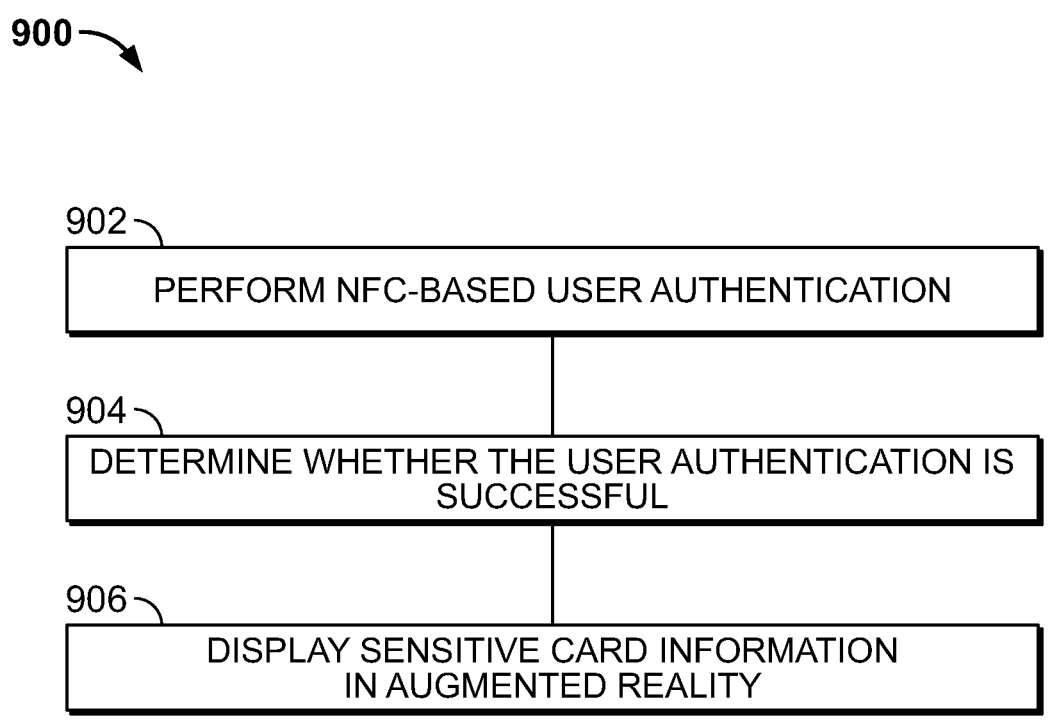
FIG. 9 illustrates an example flow diagram in accordance with one or more embodiments.

FIG. 9 illustrates an example flow diagram 900 according to one or more embodiments. The flow diagram 900 is related to providing a user an augmented reality display of sensitive card information based on successful NFC-based user authentication. It may be understood that the blocks of the flow diagram 900 and the features described therein are not required to be performed in any particular order. Moreover, it may be understood that the flow diagram 900 and the features described therein may be executed by one or more processors or any suitable computing device or computing architecture described herein.

At block 902, NFC-based user authentication may be performed to allow AR display of sensitive card information to a user. The NFC-based user authentication, as described above, may be performed by one tapping or single tapping a contactless card to a mobile device. When the contactless card is tapped to or otherwise brought near the mobile device, the mobile device may detect the presence of the contactless via NFC. The NFC communication may allow the contactless card to send one or more cryptograms to the mobile device via the NFC (e.g., via NDEF messages). Information in the one or more cryptograms, such as a customer identifier, may be encrypted with a diversified key.

When the mobile device receives the one or more cryptograms, information contained therein can be decrypted in at least two ways. In one example, the mobile device itself may be configured to decrypt the information via the diversified key used to encrypt the information in the cryptogram (s). In another example, the mobile device may send the one or more cryptograms to remote computing device(s) (e.g., backend servers, authentication servers, cloud-based serves), where the remote computing device(s) can perform the decryption using the diversified key.

Once the information in the cryptogram(s), including the customer identifier, has been decrypted, the customer identifier can be matched against a customer identifier that is verifiably associated with the user. In at least that regard, if the two customer identifiers do not match, it can be determined that the contactless card that the user tapped to the mobile device does not belong to nor authorized for the user.

At block 904, it may be determined whether the user authentication is successful. In examples, successful user authentication may be confirmed if the two above-described customer identifiers match. The positive match may indicate that the contactless card belongs to and is authorized for the user.

At block 906, upon successful NFC-based user authentication, sensitive card information may be displayed in AR via an AR interface. The sensitive information may be superimposed or displayed on the card. In other examples, the information may be AR displayed adjacent to the card. The user may also interact with AR elements to perform certain actions, where the AR elements include the sensitive information. Moreover, to further enhance security, one or more portions of the sensitive information may be obfuscated when displayed in AR. The obfuscated portions can be revealed only if the user enters the correct verification information (e.g., password, PIN, etc.).

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
    a camera;
    a near-field communication (NFC) reader;
    memory to store instructions; and
    one or more processors, coupled with the memory, operable to execute the instructions that, when executed, cause the one or more processors to:
        detect a contactless card via the NFC reader, the contactless card being tapped to the apparatus by a user;
        receive one or more cryptograms from the contactless card via NFC, wherein information in the one or more cryptograms is encrypted by the contactless card using a diversified key and the information includes at least a first customer identifier;
        decrypt the information in the one or more cryptograms using the diversified key to obtain the first customer identifier;
        determine whether the first customer identifier and a second customer identifier stored in memory match, and
        determine, based on the determination that the first and second customer identifiers match, that user authentication is successful, the successful user authentication indicating that the contactless card is issued or authorized to the user; and
        display, via an augmented reality (AR) interface, sensitive card information associated with a card on or adjacent to the card in AR when the card is detected by the camera.

2. The apparatus of claim 1, wherein the card detected by the camera is the contactless card or wherein the card detected by the camera is separate and distinct from the contactless card and issued or authorized to the user.

3. The apparatus of claim 1, wherein the diversified key is generated by providing a master key and a particular counter value to a cryptographic algorithm to obtain an output, the output being the diversified key.

4. The apparatus of claim 1, wherein the first customer identifier is a first unique alphanumeric identifier corresponding to contactless card being tapped to the apparatus and the second customer identifier is a second alphanumeric identifier corresponding to or associated with the user.

5. The apparatus of claim 1, wherein the sensitive card information includes at least a card number, a primary account number, a card verification value, and an expiration date and wherein one or more portions of the sensitive card information is obfuscated by one or more characters or symbols.

6. The apparatus of claim 5, wherein the one or more processors are further caused to:
    receive a selection of the one or more obfuscated portions of the sensitive card information;
    receive verification information, the verification information being a password or a personal identification number;
    determine whether the verification information is correct; and
    reveal, based on the determination that the verification information is correct, the selected one or more obfuscated portions of the sensitive card information; and
    display, via the AR interface, the revealed portions in AR.

7. The apparatus of claim 5, wherein the one or more processors are further caused to:
    display one or more callouts adjacent to the sensitive card information, the one or more callouts including information indicating that an AR element associated with the card information is selectable or interactable by the user to perform an action,
    wherein the AR element is the sensitive card information superimposed on the card, and
    wherein the action includes copying the sensitive information to a digital clipboard for use at a merchant website.

8. An apparatus comprising:
    a camera;
    a near-field communication (NFC) reader;
    memory to store instructions; and
    one or more processors, coupled with the memory, operable to execute the instructions that, when executed, cause the one or more processors to:
        detect a contactless card via the NFC reader, the contactless card being tapped to the apparatus by a user;
        receive one or more cryptograms from the contactless card via NFC, wherein information in the one or more cryptograms is encrypted by the contactless card using a diversified key and the information includes at least a first customer identifier;
        send the one or more cryptograms including the first customer identifier to one or more remote computing devices, wherein the one or more remote computing devices performs at least the decryption of the information in the one or more cryptograms using the diversified key;
        receive an indication or confirmation from the one or more remote computing devices that the user is authenticated or that the first customer identifier and a second customer identifier stored at the one or more computing devices or a database match;
        determine, based on the indication or the confirmation from the remote computing devices, that user authentication is successful, the successful user authentication indicating that the contactless card is issued or authorized to the user; and
        display, via an augmented reality (AR) interface, sensitive card information associated with a card on or adjacent to the card in AR when the card is detected by the camera.

9. The apparatus of claim 8, wherein the card detected by the camera is the contactless card or wherein the card detected by the camera is separate and distinct from the contactless card and issued or authorized to the user.

10. The apparatus of claim 8, wherein the diversified key is generated by providing a master key and a particular counter value to a cryptographic algorithm to obtain an output, the output being the diversified key.

11. The apparatus of claim 8, wherein the first customer identifier is a first unique alphanumeric identifier corresponding to contactless card being tapped to the apparatus and the second customer identifier is a second alphanumeric identifier corresponding to or associated with the user.

12. The apparatus of claim 8, wherein the sensitive card information includes at least a card number, a primary account number, a card verification value, and an expiration date and wherein one or more portions of the sensitive card information is obfuscated by one or more characters or symbols.

13. The apparatus of claim 12, wherein the one or more processors are further caused to:
  receive a selection of the one or more obfuscated portions of the sensitive card information;
  receive verification information, the verification information being a password or a personal identification number;
  determine whether the verification information is correct; and
  reveal, based on the determination that the verification information is correct, the selected one or more obfuscated portions of the sensitive card information; and
  display, via the AR interface, the revealed portions in AR.

14. The apparatus of claim 12, wherein the one or more processors are further caused to:
  display one or more callouts adjacent to the sensitive card information, the one or more callouts including information indicating that an AR element associated with the card information is selectable or interactable by the user to perform an action,
  wherein the AR element is the sensitive card information superimposed on the card, and
  wherein the action includes copying the sensitive information to a digital clipboard for use at a merchant website.

15. The apparatus of claim 8, wherein the one or more remote computing devices are backend authentication servers with access to the database and a plurality of authentication-based services.

16. A non-transitory computer-readable storage medium storing computer-readable program code executable by at least one processor to:
  detect a contactless card via a near-field communication (NFC) reader, the contactless card being tapped to an apparatus by a user;
  receive one or more cryptograms from the contactless card via NFC, wherein information in the one or more cryptograms is encrypted by the contactless card using a diversified key and the information includes at least a first customer identifier;
  perform user authentication by:
    (i) decrypting the information in the one or more cryptograms using the diversified key to obtain the first customer identifier and (ii) determining whether the first customer identifier and a second customer identifier stored in memory match, or
    (i) sending the one or more cryptograms including the first customer identifier to one or more remote computing devices, wherein the one or more remote computing devices performs at least the decryption of the information in the one or more cryptograms using the diversified key and (ii) receiving an indication or confirmation from the one or more remote computing devices that the user is authenticated or that the first customer identifier and a second customer identifier stored at the one or more computing devices or a database match; and
  determine, based on the determination that the first and second customer identifiers match, that user authentication is successful, the successful user authentication indicating that the contactless card is issued or authorized to the user; and
  display, via an augmented reality (AR) interface, sensitive card information associated with a card on or adjacent to the card in AR when the card is detected by the camera.

17. The non-transitory computer-readable storage medium of claim 16, wherein the card detected by the camera is the contactless card or wherein the card detected by the camera is separate and distinct from the contactless card and issued or authorized to the user.

18. The non-transitory computer-readable storage medium of claim 16, wherein the diversified key is generated by providing a master key and a particular counter value to a cryptographic algorithm to obtain an output, the output being the diversified key.

19. The non-transitory computer-readable storage medium of claim 16, wherein the first customer identifier is a first unique alphanumeric identifier corresponding to contactless card being tapped to the apparatus and the second customer identifier is a second alphanumeric identifier corresponding to or associated with the user.

20. The non-transitory computer-readable storage medium of claim 16, wherein the sensitive card information includes at least a card number, a primary account number, a card verification value, and an expiration date and wherein one or more portions of the sensitive card information is obfuscated by one or more characters or symbols.

* * * * *